(12) United States Patent
Sturm et al.

(10) Patent No.: US 6,764,064 B2
(45) Date of Patent: Jul. 20, 2004

(54) FLUID DISPENSING AND STORAGE SYSTEM WITH A DRINK VALVE

(75) Inventors: Sven Sturm, Aptos, CA (US); Brendan Erik Pierce, Los Gatos, CA (US)

(73) Assignee: HydraPak, Berkley, CA (US)

( * ) Notice: Subject to any disclaimer, the term of this patent is extended or adjusted under 35 U.S.C. 154(b) by 105 days.

(21) Appl. No.: 10/074,486

(22) Filed: Feb. 12, 2002

(65) Prior Publication Data

US 2003/0150877 A1 Aug. 14, 2003

(51) Int. Cl.[7] .............................................. F16K 31/00
(52) U.S. Cl. ..................................... 251/342; 222/175
(58) Field of Search ........................ 222/175; 251/341, 251/342; 220/714; 224/148.2

(56) References Cited

U.S. PATENT DOCUMENTS

| | | |
|---|---|---|
| 2,815,981 A | 12/1957 | Nonnamaker et al. |
| 3,646,955 A | 3/1972 | Olde |
| 3,822,720 A | 7/1974 | Souza |
| 4,090,650 A | 5/1978 | Gotta |
| 4,095,812 A | 6/1978 | Rowe |
| 4,402,343 A | 9/1983 | Thompson et al. |
| 4,629,098 A | 12/1986 | Eger |
| 4,739,905 A | 4/1988 | Nelson |
| 4,776,495 A | 10/1988 | Vignot |
| 4,850,566 A | 7/1989 | Riggert |
| 4,852,781 A | 8/1989 | Shurnick et al. |
| 4,941,598 A | 7/1990 | Lambelet, Jr. et al. |
| 4,948,023 A | 8/1990 | Tripp |
| 5,060,833 A | 10/1991 | Edison et al. |
| 5,065,700 A | 11/1991 | Cross |
| 5,085,349 A | 2/1992 | Fawcett |
| 5,104,016 A | 4/1992 | Runkel |
| 5,911,406 A | 6/1999 | Winefordner et al. |
| 5,971,357 A | 10/1999 | Denton et al. |
| 6,039,305 A | 3/2000 | Hoskins et al. |

*Primary Examiner*—Edward K. Look
*Assistant Examiner*—John K. Fristoe, Jr.
(74) *Attorney, Agent, or Firm*—Merchant & Gould P.C.

(57) ABSTRACT

A drink valve including a housing, a valve member telescopically engaged within the opening of the housing with the housing and valve member being in fluid communication and including a flow path defined by openings of the housing and valve member, and an actuating mechanism including a deformable seal defined by a deformable sidewall of the housing, where the actuating mechanism includes a fluid tight seal that prevents fluid flow in a normally closed position and is actuatable into an open position to enable fluid flow through the flow path when the sidewall of the housing is deformed.

6 Claims, 11 Drawing Sheets

FLUID DISPENSING AND STORAGE SYSTEM WITH A DRINK VALVE

FIELD OF THE INVENTION

This invention relates to a fluid dispensing and storage system. Particularly, this invention relates to an orally activated fluid dispensing system incorporating an orally activated valve device.

BACKGROUND OF THE INVENTION

As bodily liquids are depleted, they must be replenished in maintaining a person's health including preventing injury or even death, such as from dehydration. More specifically, during physical exercise, one loses bodily liquids at a much more rapid pace. Other factors, such as the degree of activity including physical exertion and length of exercise, as well as environmental conditions, for instance, increased ambient temperature, humidity, wind resistance, and even the wearing apparel a person is wearing may contribute to a higher rate of bodily liquid loss. Therefore, there is a need to maintain and replenish bodily liquid supplies to those engaging in such physical activity. Further, there is a need for a way to continuously provide replenishing liquids to those who engage in physical activity as their bodily liquid supplies are depleted.

An example of this need can be seen in bicyclists, long distance runners, hikers, and other athletes that may not have a water supply or a replenishing liquid supply readily available to provide for the continuous need to maintain bodily liquid levels.

U.S. Pat. No. 5,085,349 to Fawcett describes a resilient valve and dispensing system for bicyclists incorporating a container having a tube connected to the container at one end and connected to a valve at the other end. The valve has a deformable closure member at one end that includes a slit extending in an axis transverse to the flow path through the valve. When the closure member of the valve is deformed by a user along the same axis that the slit is formed, the slit opens from a normally closed position to provide liquid from the container to the system user.

U.S. Pat. No. 5,911,406 to Winefordner et al. describes a liquid dispensing system incorporating an orally activated valve device to draw liquid from a container through a tube. Winefordner et al. employs a valve that includes a valve plunger that can be depressed or deformed to an open configuration to enable fluid flow to a user's mouth.

Other drink valves have employed particular shapes that inherently define a bite direction or orientation for operation, or use an excess of irritation ribs providing a less intuitive device. Other drink valves have small or two-dimensional openings, which may not allow for adequate liquid flow or may need a high activating force. Also, other drink valves can become loose or separated exhibiting undesired leaking problems when not in use, or they may include a large outside shape making use of the valve cumbersome and inconvenient.

Although some of these devices may be useful for their intended purposes, improvements can be made to existing liquid dispensing designs that incorporate drink valves. In addition, there is a need to provide a more reliable drink valve that is convenient to use.

SUMMARY OF THE INVENTION

In accordance with the principles of the present invention, a fluid dispensing system includes a valve structure that improves upon and solves problems associated with previous designs. The present invention provides a fluid dispensing system with a fluid source, the fluid source is connected to a first end of a fluid line, and a drink valve is suitably connected to a second end of the fluid line that is actuatable from a normally closed position to an open position when in use.

In one embodiment, a drink valve includes a housing with a first end and a second end. The housing defines an opening extending longitudinally between the first and second ends. A valve member is telescopically engaged and resides within the opening of the housing. The valve member includes a first end and a second end. The valve member provides an opening extending longitudinally between the first and second ends, and defined by an inlet at the first end and an outlet disposed downstream of the inlet toward the second end. The housing and the valve member are in fluid communication and a flow path is defined by the openings of the housing and the valve member. An actuating mechanism includes a deformable seal defined by a resilient sidewall of the housing being deformable about the valve member. The actuating mechanism provides a fluid tight seal preventing fluid flow in a normally closed position, and is actuated to an open position when the sidewall of the housing is deformed to enable liquid to pass through the flow path.

In one embodiment, the first ends of the housing and the valve member are suitable for attachment to a fluid line.

In one embodiment, the second end of the housing is suitable for engagement by a valve operator including a pair of shoulder portions proximal to the second end and disposed about the outer sidewall of the housing on the outside of the housing. Preferably, the shoulders are spaced apart a suitable distance so as to facilitate engagement by a valve operator.

In another embodiment, the second end of the housing includes a chamber in fluid communication with the openings of the housing and the valve member.

In one embodiment, the valve member includes a plurality of ribs that extend longitudinally from the outlet of the valve member, and the ribs define a plurality of apertures in fluid communication with the openings of the housing and the valve member. Preferably, the ribs are commonly connected to the second end of the valve member. More preferably, the ribs reside within the chamber when the valve member is telescopically engaged with the housing.

In one embodiment, the deformable seal of the actuating mechanism includes a sealing structure disposed about an inner side of the resilient sidewall, and cooperates with a sealing member disposed at the second end of the valve member. Preferably, the sealing structure is a sealing lip. More preferably, the sealing structure is a resilient material, and includes a preload so that the sealing structure presses and stretches about the sealing member to provide a suitable seal.

In one embodiment, the sealing member is substantially shaped as a portion of a sphere. Preferably, the sealing member is substantially shaped as a hemisphere.

In one embodiment, the open position occurs when oppositely applied forces press upon and deform the sidewall of the housing to actuate the actuating mechanism to the open position. Preferably, the oppositely applied forces are a squeeze force. More preferably, the oppositely applied forces are transverse to the direction of the flow path and along any radial position about the outer sidewall of the second end of the housing.

In one embodiment, the open position of the drink valve is a three-dimensional opening defined by the chamber, the sealing structure of the housing, and the sealing member.

In one embodiment, the housing is a one-piece integrally molded structure. Preferably, the housing is a soft resilient plastic material.

In one embodiment, the valve member is a one-piece integrally molded structure. Preferably, the valve member is a hard rigid plastic material.

In another embodiment, the drink valve includes a housing and a valve member together forming a two-piece device.

In another embodiment, the drink valve may be actuated by the operator's mouth, teeth, or hands.

In one embodiment a fluid dispensing system includes a fluid source. The fluid source is a container having a fluid reservoir and is suitable for attachment to one end of a fluid line. The fluid line is connected with a drink valve at the other end of the fluid line. The drink valve includes a housing and a valve member telescopically engaged within the housing. The housing and the valve member are in fluid communication and a flow path is defined between first and second ends of the housing and the valve member. An actuating mechanism includes a sealing member disposed at the second end of the valve member in cooperation with a resilient sidewall at the second end of the housing. The actuating mechanism provides a fluid tight seal preventing fluid flow in a normally closed position, and is actuated in an open position when the sidewall of the housing is deformed to enable liquid to pass through the flow path.

Preferably, the container is a flexible portable container. More preferably, the container is a pack that may be securely harnessed to a user. More preferably, the container may be a pack securely harnessed to a back of the user. The container may be an integral reservoir formed within the pack, or may be a flexible plastic bag detachably connected to the pack.

The present invention provides an improved design of a fluid dispensing system that is more convenient for use and inexpensive to manufacture while still being able to provide suitable liquid flow and delivery to a user. One advantage of the present invention provides a drink valve that is non-directional and may be operated about any radial position about its cylindrical sidewall. The structure of the valve lends for a device easily held in an operator's mouth, lips or teeth so that it is easy to bite, and is intuitive for a user to find a position to operate the valve. The design of the housing and valve member provide a leak proof valve, and may be actuated to allow a suitable flow of liquid to the operator. Further, the rib structure of the valve member prevents any restriction in flow when the drink valve is actuated. The two-piece design can be easily cleaned and allows the drink valve to be reliably connected with the fluid line.

These and other various advantages and features of novelty, which characterize the invention, are pointed out in the following detailed description. For better understanding of the invention, its advantages, and the objects obtained by its use, reference should also be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the illustrated embodiments, reference is made to the accompanying drawings that form a part hereof, and in which is shown by way of illustration of the embodiments in which the invention may be practiced. It is to be understood that other embodiments may be utilized as structural changes may be made without departing from the spirit and scope of the present invention.

Figure 1:
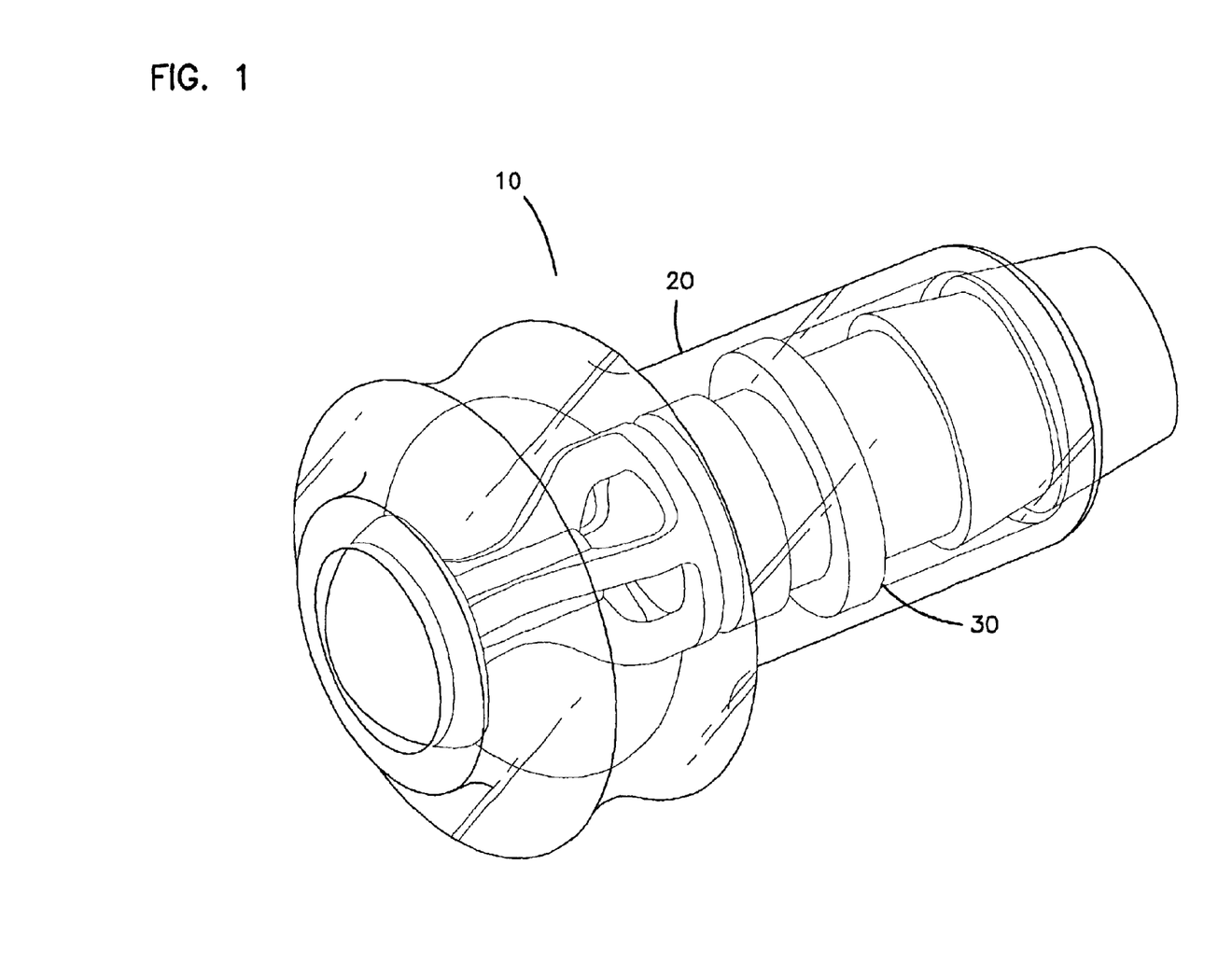
FIG. 1 represents a perspective view of one embodiment of a drink valve in accordance with the principles of the present invention.
Figure 1A:
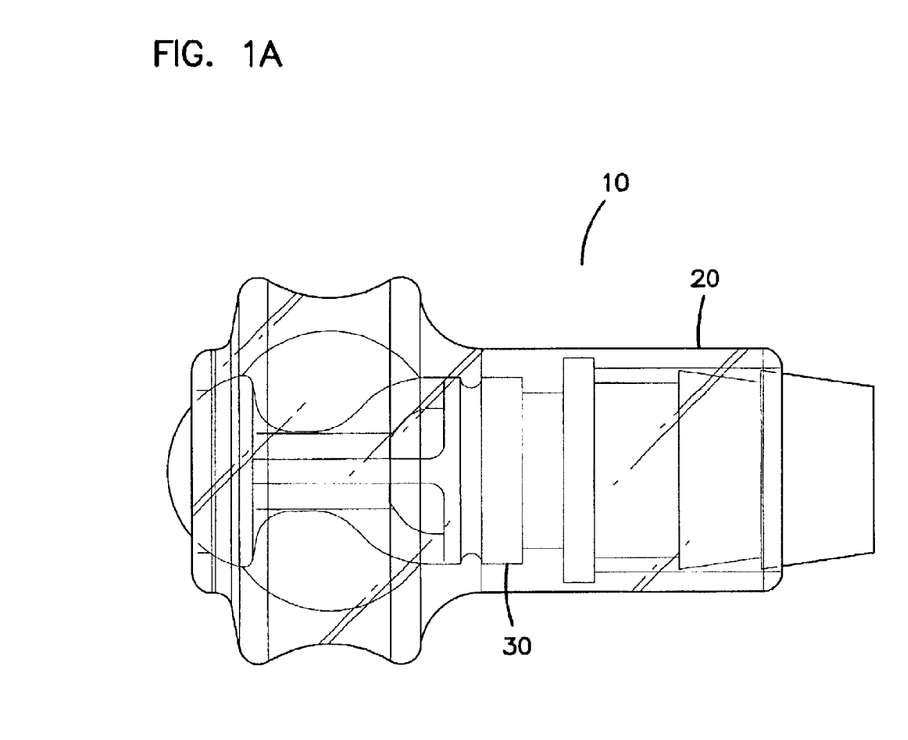
FIG. 1A represents a side cross-sectional view of the drink valve of FIG. 1.
Figure 1B:
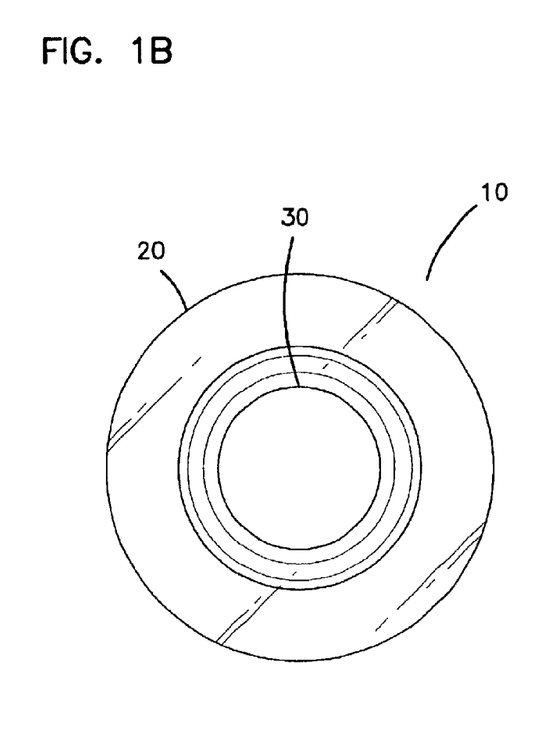
FIG. 1B represents a front view of the drink valve of FIG. 1.

FIGS. 1–1B illustrate an example of a drink valve in accordance with the principles of the present invention. The drink valve 10 includes a housing 20 and a valve member 30. As shown in FIGS. 1 and 1A, the housing is a translucent structure. However, it will be understood that the translucent structure of the housing depicted in FIGS. 1 and 1A is merely exemplary as other configurations may be employed, for instance an opaque structure. The valve member 30 resides within the housing 20 and forms a fluid tight seal with the housing 20 when the drink valve 10 is in a closed position. The drink valve 10 is shown in its closed configuration in FIGS. 1–1B.

Figure 2:
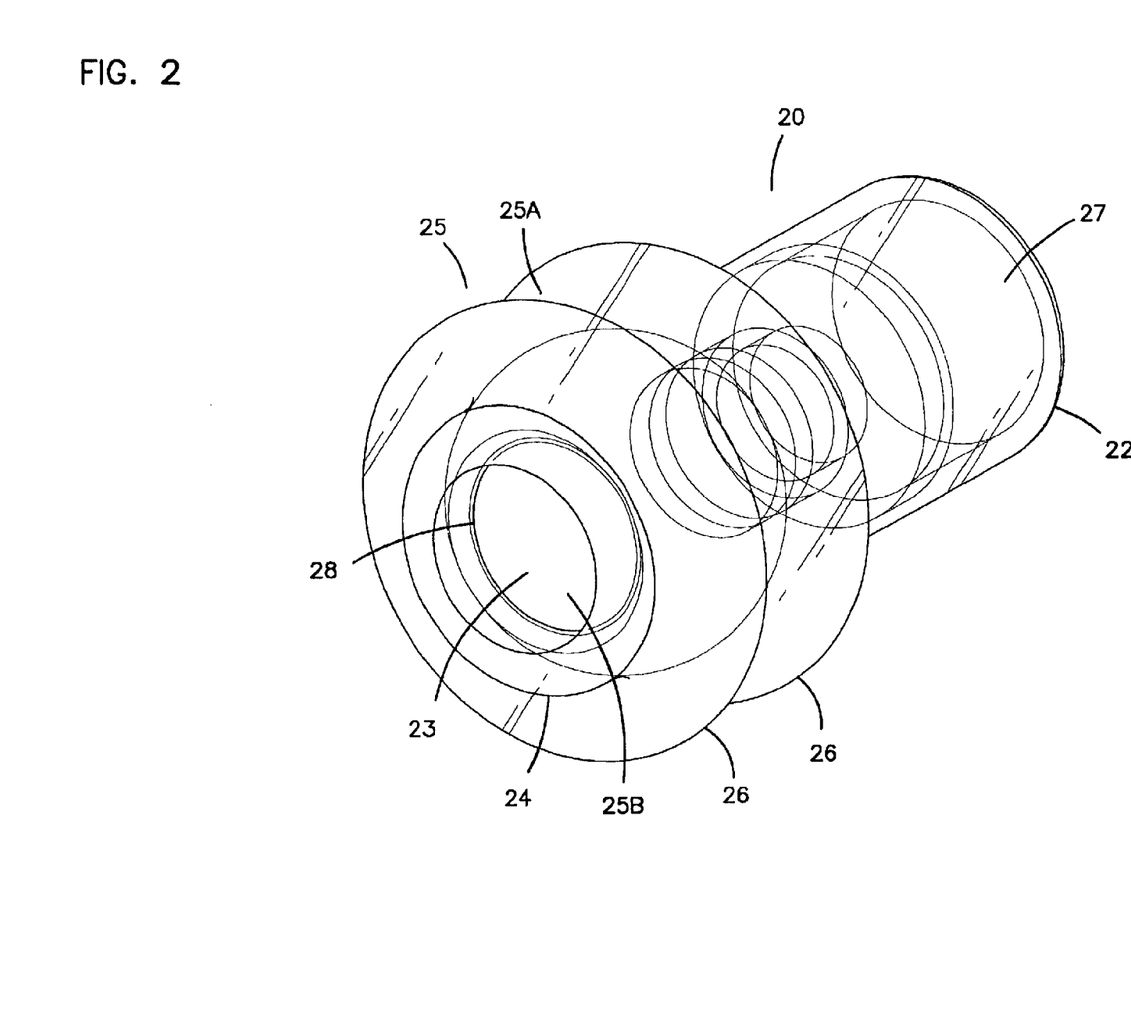
FIG. 2 represents a perspective view of one embodiment of a housing of a drink valve in accordance with the principles of the present invention.
Figure 2A:
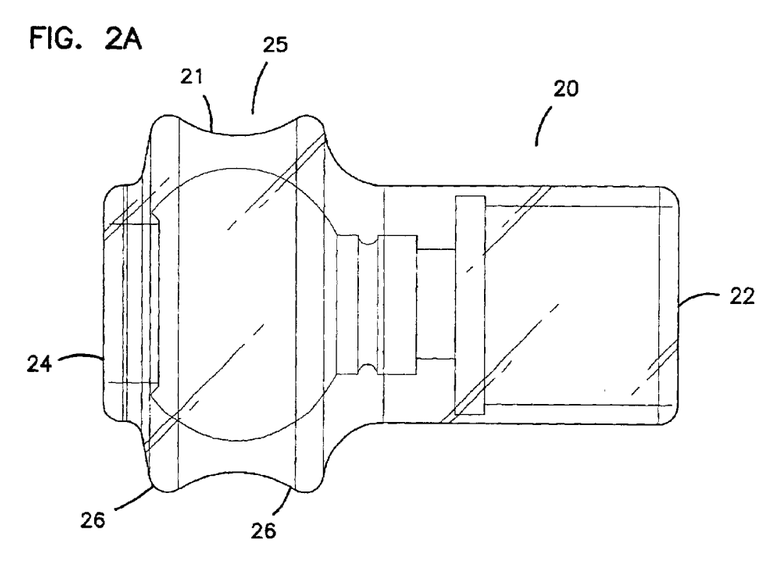
FIG. 2A represents a side view of the housing of FIG. 2.
Figure 2B:
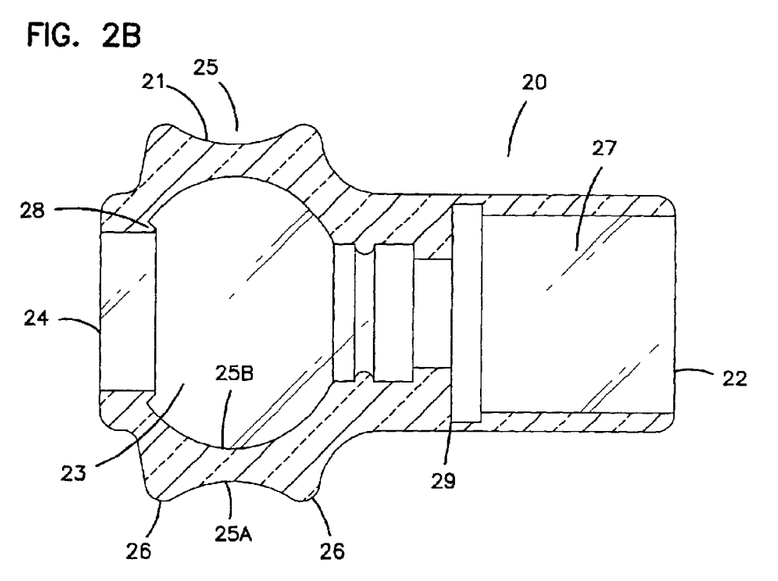
FIG. 2B represents a side cross-sectional view of the housing of FIG. 2.

FIGS. 2–2B illustrate the housing 20. The housing 20 includes a first end 22 and a second end 24. FIG. 2 shows the housing includes a sidewall 25, and shoulder portions 26 proximate the second end 24. The shoulder portions 26 form a part of and are disposed about the sidewall 25 or outer sidewall 25a. As shown in FIGS. 2 and 2A, the shoulder portions 26 are illustrated as bulges protruding radially outward from the outer sidewall 25a. However, the bulges are merely exemplary and it will be appreciated that other configurations or structures, such as tabs or other protrusions may be employed. A distance is provided between the shoulder portions 26. Between the shoulder portions 26, a surface 21 provides a region for a valve operator to engage the drink valve 10. The surface 21 may be curved, as shown in FIGS. 2–2B for comfort and convenience in handling.

FIG. 2B illustrates a longitudinal cross section of the housing 20. The first end 22 and the second end 24 define an opening 27 extending longitudinally therethrough between the first and second ends 22, 24. A chamber 23 is disposed proximate the second end 24. As shown in FIG. 2B, the chamber 23 is illustrated as an expanded region residing within the opening 27 and located about an inner sidewall 25b. The chamber 23, as shown in FIG. 2B, is bound by the inner sidewall 25b having a curved surface, where the inner sidewall 25b curves outward from the center of the chamber 23. It will be appreciated that the shape of the inner sidewall 25b shown in FIG. 2B is merely exemplary, as other surface shapes may be employed. The chamber 23 is in fluid communication with the opening 27, and includes a sealing structure 28 residing toward the second end 24 about the inner sidewall 25b. The sealing structure 28 is illustrated as a sealing lip. However, it will be appreciated that other interference sealing structures also may be employed. Further, the sealing structure 28 is formed of a flexible material having a preload so as to be able to stretch around a structure for sealing engagement. A groove 29 is shown disposed between the first and second ends 22, 24, the function of which will be further described.

Preferably, the housing 20 of the drink valve 10 may be a one-piece integrally formed structure. More preferably, the housing may be formed of an injection molded resilient plastic material suitable for contacting liquids for drinking, such as but not limited to water. For instance, one material used to form the housing 20 of the drink valve 10 may be a flexible material such as Dynaflex® G2711 (by GLS Corporation). Usual injection molding techniques according to industry standards apply.

Figure 3:
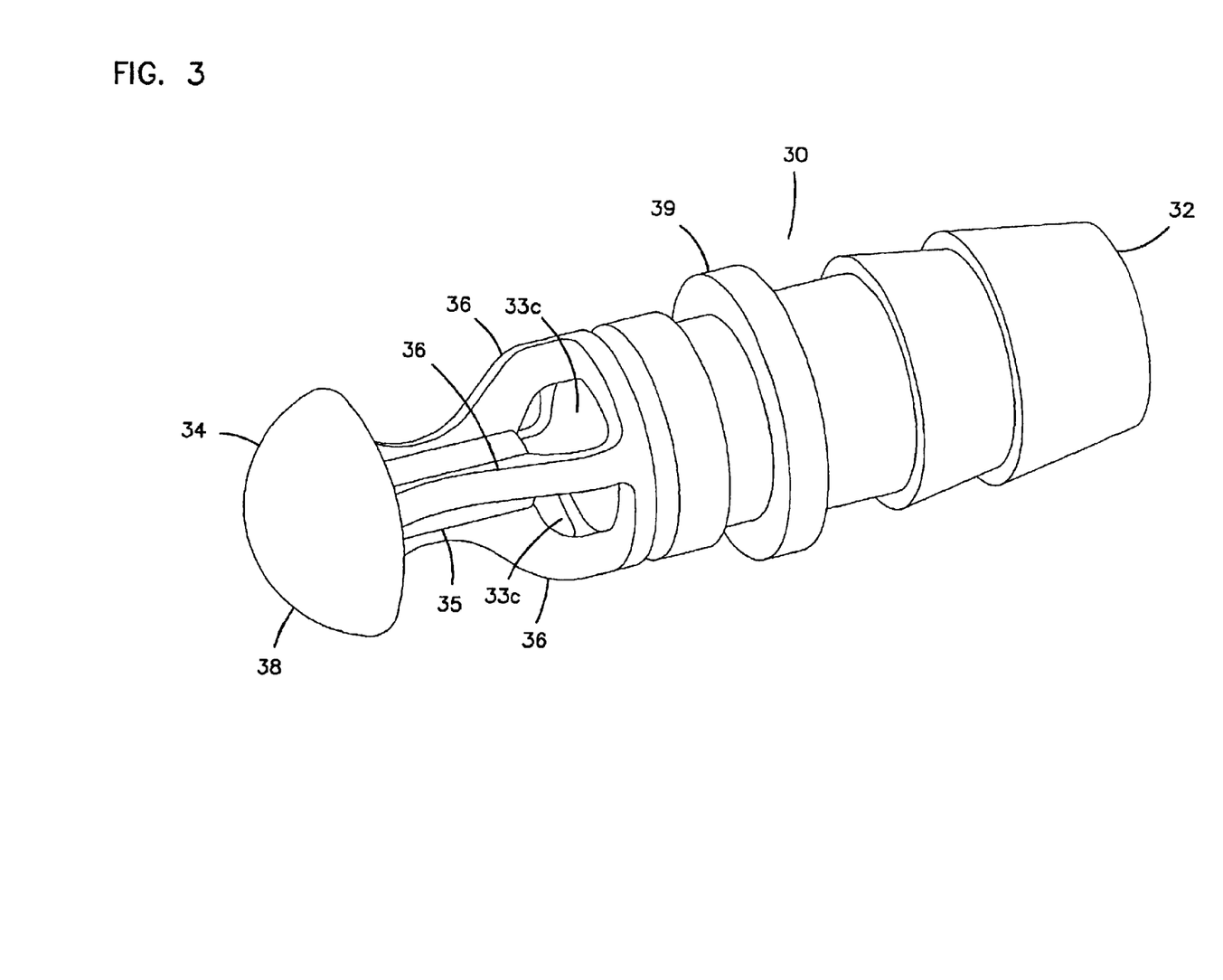
FIG. 3 represents a perspective view of one embodiment of a valve member in accordance with the principles of the present invention.
Figure 3A:
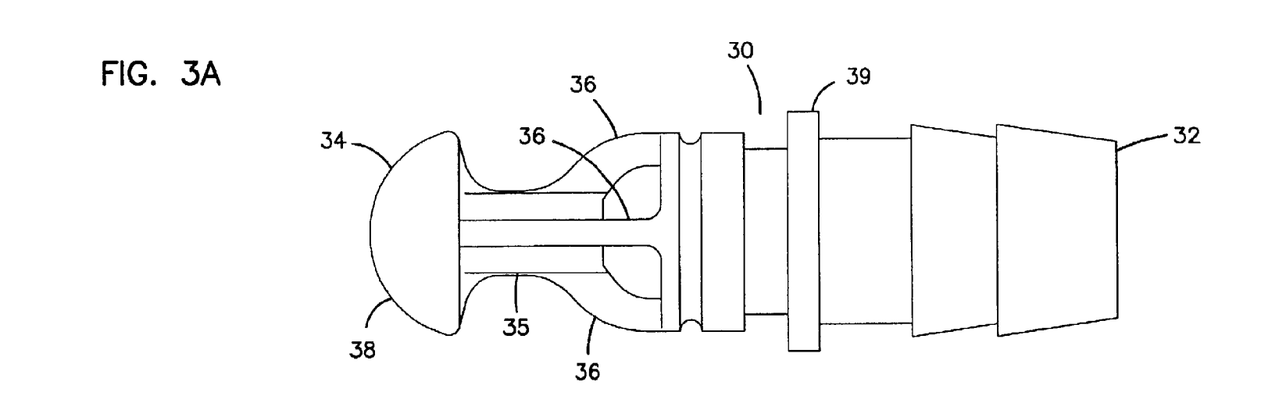
FIG. 3A represents a side view of the valve member of FIG. 3.
Figure 3B:
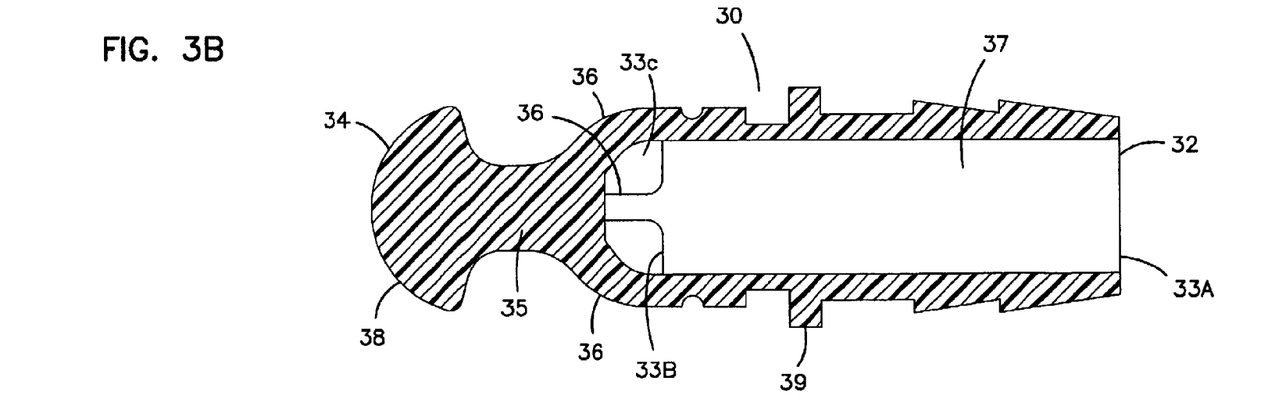
FIG. 3B represents a side cross-sectional view of the valve member of FIG. 3.

FIGS. 3–3B illustrate a valve member 30 that includes a first end 32 and a second end 34. As best shown in FIG. 3B, the first end 32 includes an opening 37 defined longitudinally between an inlet 33a of the first end 32 and an outlet 33b disposed downstream of the inlet 33a and toward the second end 34. The first end 32 may be a barbed end suitable for connection to a fluid line. A ring 39 disposed about the outer surface of the valve member 30 is engageable with the groove 29 of the housing 20 to provide a fluid tight seal between the housing 20 and the valve member 30 and retain the valve member 30 within the housing 20 (as shown in FIGS. 1–1B).

A plurality of ribs 36 extend longitudinally from the outlet 33b. The ribs 36 are connected to the second end 34 and define a plurality of apertures 33c between the ribs 36. The apertures 33c are in fluid communication with the openings 27 and 37 including the inlet 33a and the outlet 33b. FIG. 3 illustrates four ribs defining four apertures. Preferably, four ribs 36 and four apertures 33c are provided in the valve member structure 30, the advantage of which will be discussed below. However, this configuration is merely exemplary, as it will be appreciated that other numbers of ribs and apertures may be employed. As shown in FIGS. 3–3B, the ribs 36 are commonly connected to the second end 34 through a shaft portion 35. It will be appreciated that other configurations may be applicable, for instance, each rib 36 may be independently connected with the second end 34. As shown in FIGS. 3–3B, the shaft portion 35 defines a width more narrow relative to a width defined by the second end 34 or by the ribs 36. Further, the ribs 36 including the apertures 33c and the shaft portion 35 reside within the chamber 23 of the housing 20 when the valve member 30 is telescopically engaged with the housing 20.

The second end 34 provides a sealing member 38. The sealing member 38 operatively engages the sealing structure 28 of the housing 20 to provide a fluid tight seal when the drink valve 10 is in the closed position. As described above, the sealing structure 28 of the housing 20 is formed of a flexible material having a preload so as to be able to stretch around a structure for sealing engagement. Particularly, as best shown in FIGS. 1–1B, the sealing structure 28 stretches around the sealing member 38 of the valve member 20 residing within the housing 20 in providing the closed configuration and fluid tight seal. As illustrated in FIGS. 3–3B, the sealing member 38 is shaped as a portion of a sphere. More preferably, the sealing member 38 is shaped as a hemisphere.

Preferably, the valve member 38 is made of a one-piece integrally molded structure. More preferably, the valve member is an injection molded material of a hard rigid plastic material suitable for contacting liquids for drinking, such as but not limited to water. For instance, one material used to form the valve member 30 of the drink valve 10 may be a rigid material such as Delrin® 500 (by Dupont). Usual injection molding techniques according to industry standards apply.

Figure 4A:
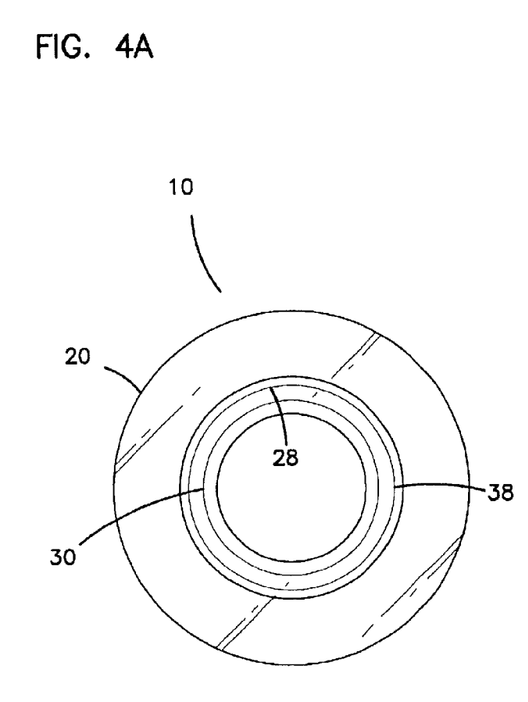
FIG. 4A represents a front view of a drink valve in a closed position in accordance with the principles of the present invention.
Figure 4B:
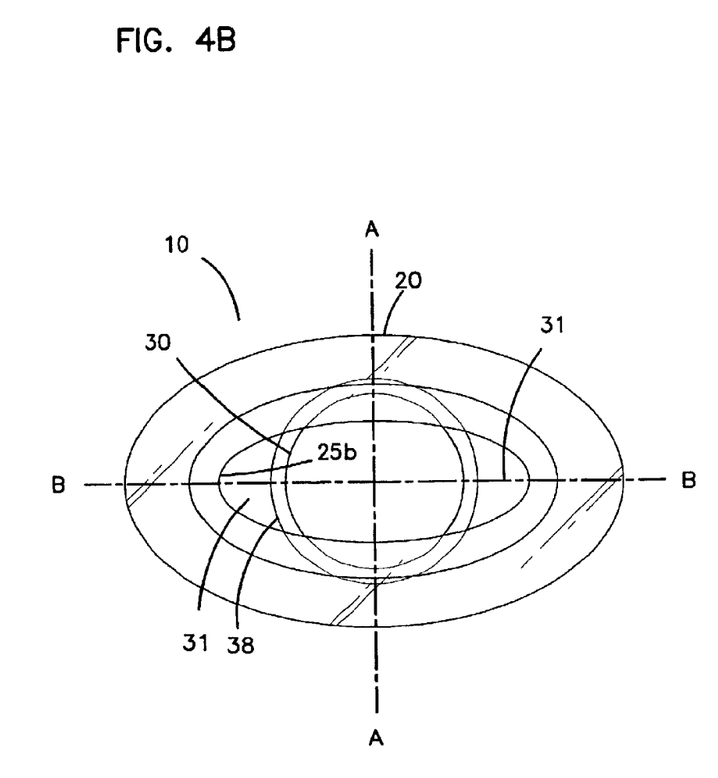
FIG. 4B represents a front view of the drink valve of FIG. 4A in an open position in accordance with the principles of the present invention.

FIGS. 4A and 4B illustrate the closed and open configurations of the drink valve 10, respectively. In FIG. 4A, the drink valve 10 is in the closed position. The housing 20 contains the valve member 30 residing within the housing 20. The drink valve 10 is shown in its normal state or when not in use. The housing 20 forms a seal with the valve member 30 at their first ends. The seal is defined by the sealing structure 28 of sidewall 25 of the housing 20 with its flexible material having a preload designed to stretch about the sealing member 38 of the valve member 30. In the open position, the drink valve 10 is actuated from its normally closed position by applying oppositely disposed forces upon the outer sidewall 25a of the housing 20.

As discussed above, the housing 20 may be formed of a flexible resilient material. As shown in FIG. 4b, the drink valve 10 is in the open position where openings 31 are formed. Further, the openings 31 are formed when the housing 20 is deformed thereby separating the inner sidewall 25b of the housing 20, which includes the sealing structure 28, from the sealing member 38. The deformation of the housing 20 occurs toward the second end 24 when a drink valve operator engages the shoulder portions 26 at the surface 21 and including the shoulder portions 26, and applies forces oppositely disposed about the radius of the outer sidewall 25a of the housing 20. As the oppositely applied forces press the sidewall 25 of the housing along a first axis A transverse the flow path, the sidewall 25 is pushed outward along a second axis B also transverse the flow path. The second axis B may be perpendicular to the first axis A. As shown in FIG. 4b, two openings 31 are formed where the housing 20 resembles an oval shape.

The openings 31 are in fluid communication with the openings 27, 37 of the housing 20 and valve member 30, and the apertures 33c defined between the ribs 36. The drinking operation can be supported by sucking on the drink valve when in the open position. A user's teeth, lips, mouth, or hand may be used to actuate the drink valve into the open position. When the drink valve 10 is not in use, the housing 20, formed of a resilient flexible material, returns to its original shape shown in FIG. 4a, and the openings 31 are closed resuming the fluid tight seal of FIG. 4a.

The deformation of the housing 20 forms openings 31 by applying moderate forces as described above. The oppositely disposed force may be applied about any position about the radius of the housing 20 that is transverse to the flow path defined by the openings 27, 37 of the housing and valve member and the apertures 33c. Particularly, the axes A, B may be arranged about any radial position about the sidewall 25 of the housing 20. The structure of the shaft portion 35 and the ribs 36 and apertures 33c residing within the chamber 23 of the housing 20 provides a substantial space within the chamber 23 that helps facilitate maximum fluid flow through the flow path and openings 31. Such a structure provides a three-dimensional opening design that enables unrestricted fluid flow when the drink valve is actuated into the open position. Using the substantial space, the sidewall 25 of the housing 20 can be pressed toward the valve member 30 along the first axis A by the oppositely applied forces while simultaneously increasing openings 31 along the second axis B.

The plurality of ribs 36 defining the apertures 33c enable fluid flow to be continued in the event excessive forces are applied to the sidewall 25 of the housing 20. Particularly, when four ribs 36 and four apertures 33c are employed (FIGS. 1–3) at least two apertures will remain open to maintain suitable fluid flow in the event excessive forces are applied to the sidewall 25, where one or even two apertures 33c is unintentionally closed during operation of the drink valve 10.

Figure 5:
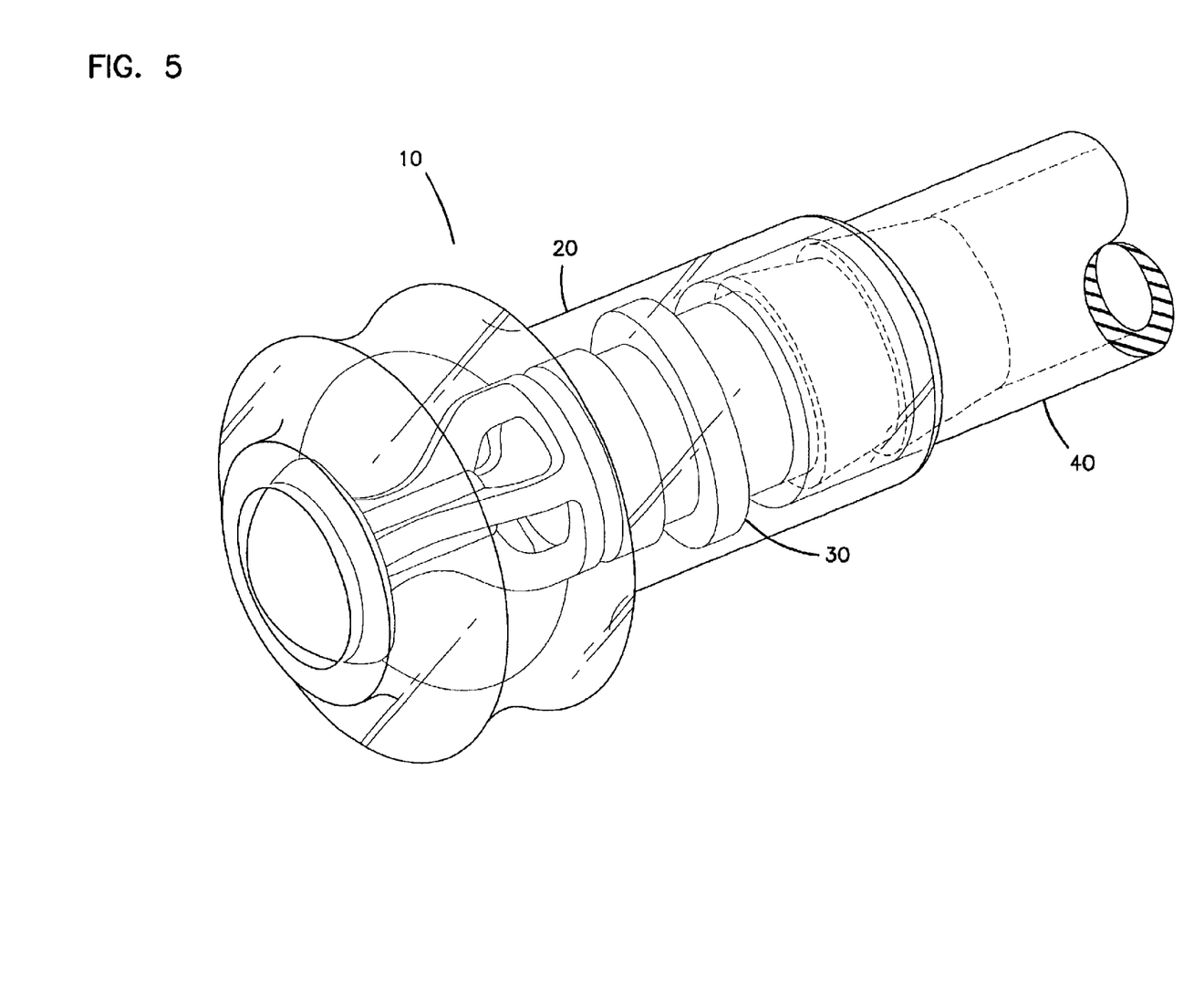
FIG. 5 represents one embodiment of a drink valve suitably connected with a fluid line.

FIG. 5 illustrates the drink valve 10 of the previous FIGS. 1–4 suitably connected to a fluid line 40. The valve member 30 is shown inserted into an end of the fluid line 40 while the housing 20 covers the end of the fluid line 40. An interference fit is formed between the valve member 30 and the fluid line 40 by the barbed structure (as shown in FIG. 5) of the first end 34 to create a suitable seal. In addition, and interference fit is formed by the housing 20 and the fluid line 40 by the preload configuration of the housing 20 that stretches over the end of the fluid line 40 to create a suitable seal. As shown in FIG. 5, the fluid line is retained between the valve member 30 and the housing 20 thereby creating a suitable fluid tight seal.

Figure 6:
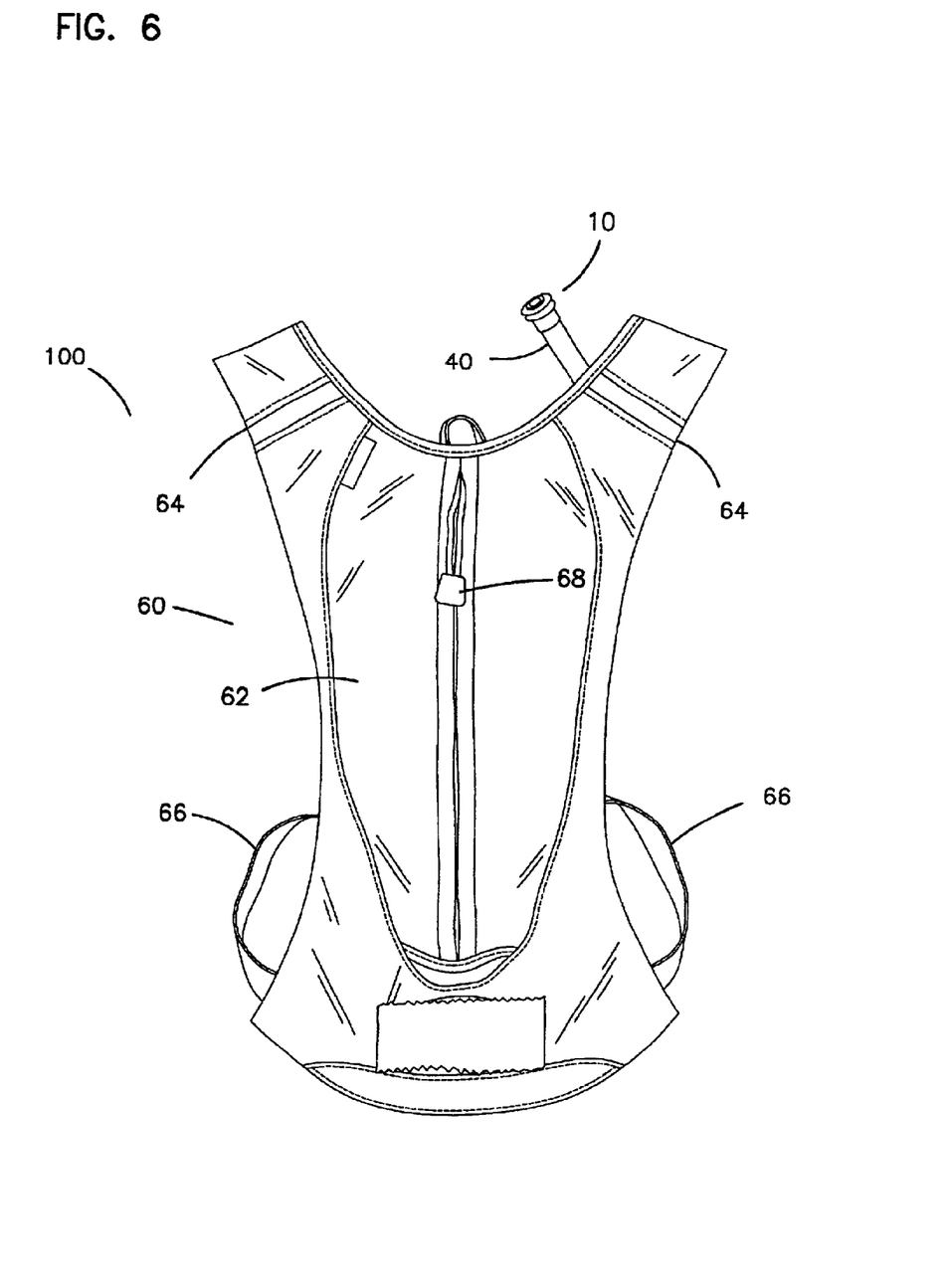
FIG. 6 represents a front view of one embodiment of a fluid dispensing system in accordance with the principles of the present invention.
Figure 7:
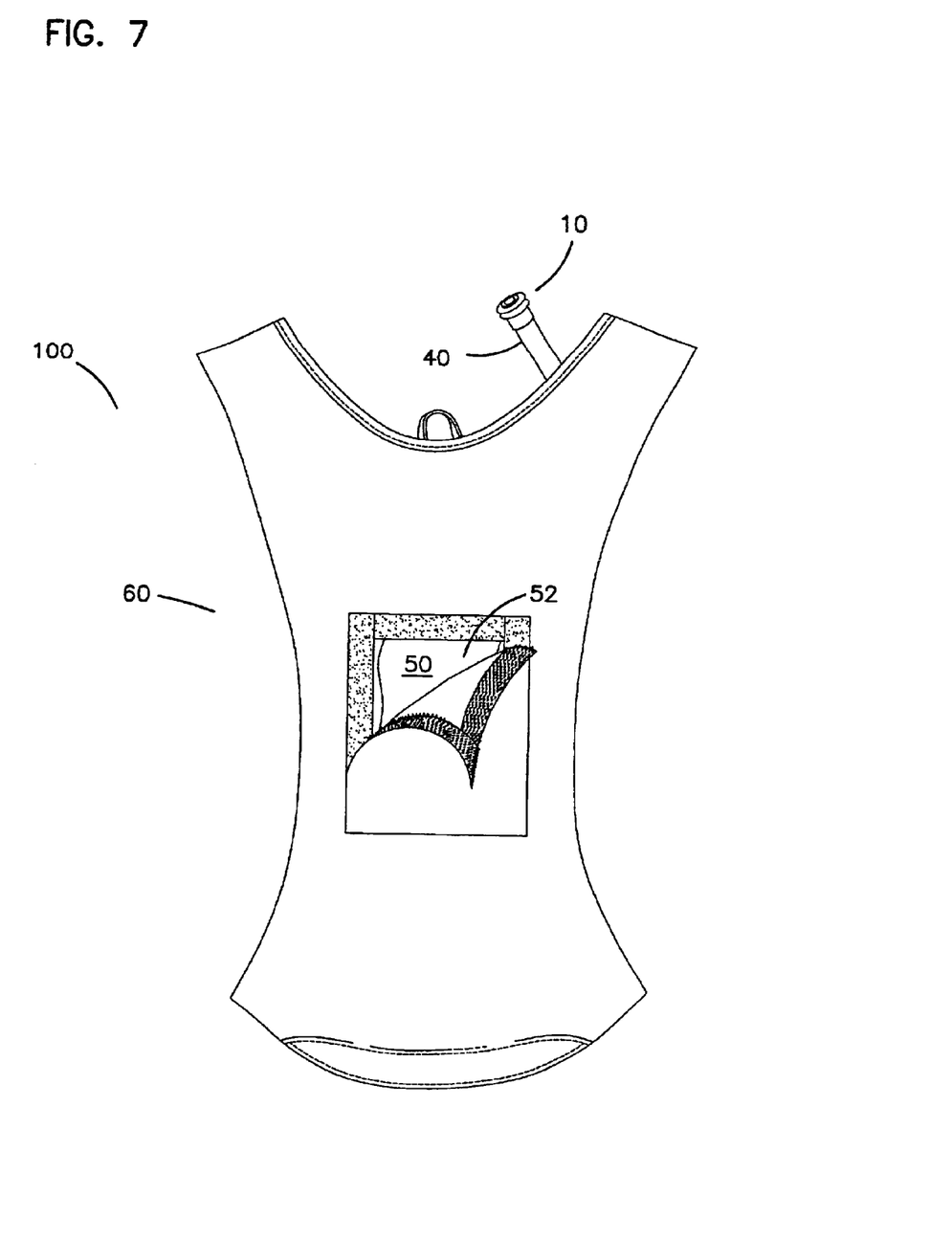
FIG. 7 represents a schematic rear view of one embodiment of a fluid dispensing system in accordance with the principles of the present invention.
Figure 8:
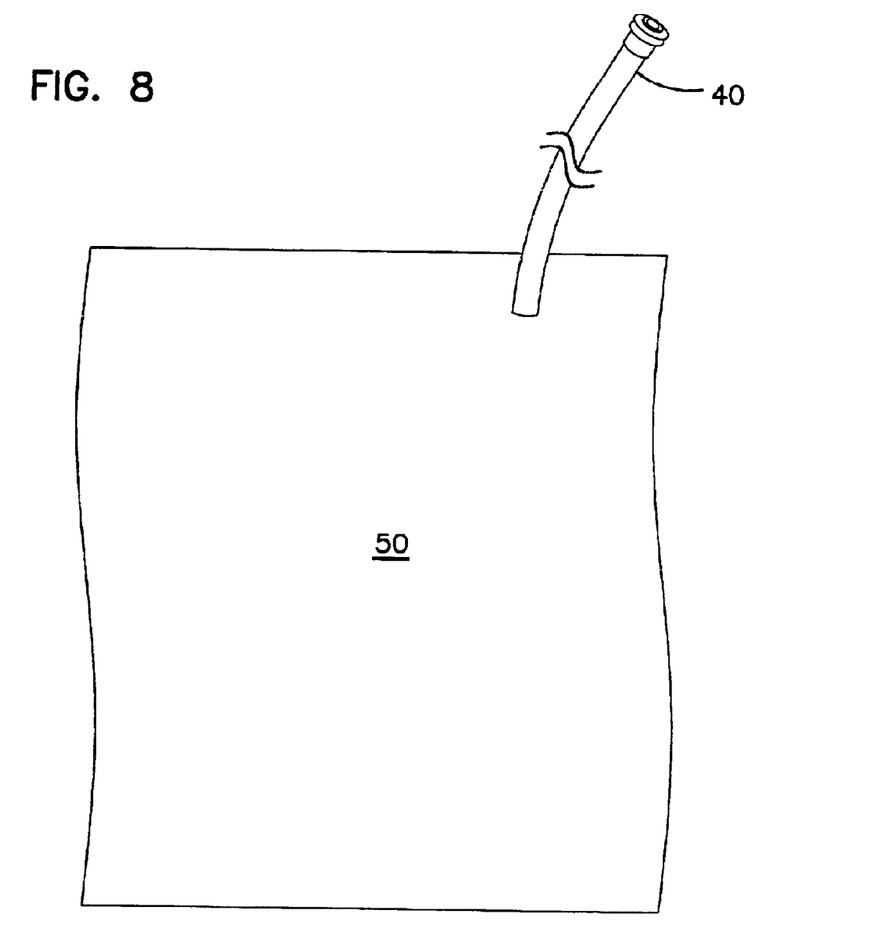
FIG. 8 represents a schematic view of one embodiment of a fluid source connected to a drink valve in accordance with the principles of the present invention.

FIGS. 6–8 illustrate one preferred embodiment of a fluid dispensing system 100 incorporating the drink valve 10 of previous FIGS. 1–5. FIG. 6 illustrates one example of a front of the fluid dispensing system 100. FIG. 7 illustrates one example of a back of the fluid dispensing system 100. The fluid dispensing system 100 includes a fluid source 50, the fluid line 40, and the drink valve 10. As shown in FIG. 6, the pack 60 may be a backpack that includes shoulder straps 64 and a waist strap 66 for harnessing the pack 60. The compartment 62 is illustrated as having a zipper 68 for accessing the compartment 62. Preferably, the compartment 62 is a storage pocket that may contain carrying gear or other user items for storage. The compartment 62 is shown in the closed position, and it will be appreciated that the compartment 62 may be opened by unfastening the zipper 68.

FIG. 7 shows the back of the fluid dispensing system 100. Preferably, the back of the fluid dispensing system 100 includes a fluid source 50. The pack 60 includes an opening 52 to access the fluid source 50. Preferably, the fluid source 50 is a flexible container including a reservoir for holding fluid, and is adaptable for connecting to the fluid line 40, as best shown in FIGS. 7 and 8. Preferably, the fluid source 50 is incorporated within the opening 52 of the pack 60. As shown in FIG. 7, the fluid dispensing system 100 is shown with the opening 52 of the pack 60 in the open position. The opening 52 may be configured of a hook and loop fastener, which can be opened and closed for accessing the fluid source 50. However, it will be appreciated that other configurations may be employed for opening and closing the opening 52 in accessing the fluid source 50. As shown in FIGS. 7 and 8, the fluid source 50 is intended to be a separate container that resides within the opening 52, and is detachably connected to the pack 60. However, it will be appreciated that the fluid source 50 may form an integral part of the pack 60.

The present invention provides the following advantages. The configuration of the sealing structure of the housing and the sealing member of the valve member enable the drink valve to be non-directional, and be operated from any bite or press direction transverse to the flow path of the drink valve. In this way, the drink valve may be rotated, and an oppositely disposed force applied about any radial position about the sidewall of the housing can actuate the drink valve into the open position. The arrangement of the ribs, apertures, and chamber into a three-dimensional opening structure enables a suitable fluid flow that is not restricted even in the event of excessive force applied to the drink valve.

In addition, the actuating mechanism provides a suitable fluid tight seal when the drink valve is in the closed position. Also, the housing groove and valve member ring structure, and preload configurations and barbed structures of the housing and valve member present a drink valve that is leak proof and fits firmly on a fluid line preventing leaks at undesired positions, for instance, the connection region of the drink valve and the fluid line.

Furthermore, the shoulder portions and curved surface provide a drink valve that is intuitive in that the drink valve is easily engaged and used by the operator. Particularly, the shoulder portions and surface structure of the housing provide an ergonomic design for comfort and convenience in handling.

In addition to other advantages, the present invention provides a two-piece design (housing and valve member) that is easily cleaned, inexpensive to manufacture, and light in mass.

The above specification, examples and data provide a complete description of the manufacture and use of the present invention. Since many embodiments of the invention can be made without departing from the spirit and scope of the invention, the invention resides in the claims hereinafter appended.

We claim:

1. A drink valve comprising:
   a housing including a first end and a second end; said housing defining an opening extending longitudinally between said first end and said second end;
   a valve member telescopically engaged within said opening of said housing; said valve member including a first end and a second end; said second end including an opening extending longitudinally between said first end and said second end; said opening defined by an inlet at said first end and an outlet disposed downstream of said inlet toward said second end;
   said housing and valve member being in fluid communication and including a flow path defined by said openings of said housing and valve member; and
   an actuating mechanism including a deformable seal defined by a deformable sidewall of said housing being deformable about said valve member; said actuating mechanism having a fluid tight seal preventing fluid flow in a normally closed position and being actuatable into an open position to enable fluid flow through said flow path when said sidewall of said housing is deformed;

wherein said deformable seal of said actuating mechanism including a sealing structure disposed about an inner side of said deformable sidewall of said housing; and a sealing member disposed at said second end of said valve member; said sealing structure operatively cooperating with said sealing member; said sealing structure is a sealing lip.

2. The drink valve according to claim 1, wherein said sealing lip is a resilient, flexible material.

3. A drink valve comprising:

a housing including a first end and a second end; said housing defining an opening extending longitudinally between said first end and said second end;

a valve member telescopically engaged within said opening of said housing; said valve member including a first end and a second end; said second end including an opening extending longitudinally between said first end and said second end; said opening defined by an inlet at said first end and an outlet disposed downstream of said inlet toward said second end;

said housing and valve member being in fluid communication and including a flow path defined by said openings of said housing and valve member; and an actuating mechanism including a deformable seal defined by a deformable sidewall of said housing being deformable about said valve member; said actuating mechanism having a fluid tight seal preventing fluid flow in a normally closed position and being actuatable into an open position to enable fluid flow through said flow path when said sidewall of said housing is deformed;

wherein said deformable seal of said actuating mechanism including a sealing structure disposed about an inner side of said deformable sidewall of said housing; and a sealing member disposed at said second end of said valve member; said sealing structure operatively cooperating with said sealing member; said sealing member is substantially shaped as a portion of a sphere.

4. A drink valve comprising:

a housing including a first end and a second end; said housing defining an opening extending longitudinally between said first end and said second end;

a valve member telescopically engaged within said opening of said housing; said valve member including a first end and a second end; said second end including an opening extending longitudinally between said first end and said second end; said opening defined by an inlet at said first end and an outlet disposed downstream of said inlet toward said second end;

said housing and valve member being in fluid communication and including a flow path defined by said openings of said housing and valve member; and an actuating mechanism including a deformable seal defined by a deformable sidewall of said housing being deformable about said valve member; said actuating mechanism having a fluid tight seal preventing fluid flow in a normally closed position and being actuatable into an open position to enable fluid flow through said flow path when said sidewall of said housing is deformed;

wherein said deformable seal of said actuating mechanism including a sealing structure disposed about an inner side of said deformable sidewall of said housing; and a sealing member disposed at said second end of said valve member; said sealing structure operatively cooperating with said sealing member; said sealing member is shaped as a hemisphere.

5. A drink valve comprising:

a housing including a first end and a second end; said housing defining an opening extending longitudinally between said first end and said second end;

a valve member telescopically engaged within said opening of said housing; said valve member including a first end and a second end; said second end including an opening extending longitudinally between said first end and said second end; said opening defined by an inlet at said first end and an outlet disposed downstream of said inlet toward said second end;

said housing and valve member being in fluid communication and including a flow path defined by said openings of said housing and valve member; and an actuating mechanism including a deformable seal defined by a deformable sidewall of said housing being deformable about said valve member; said actuating mechanism having a fluid tight seal preventing fluid flow in a normally closed position and being actuatable into an open position to enable fluid flow through said flow path when said sidewall of said housing is deformed;

wherein said open position including at least one opening at said first end of said housing and said valve member; said at least one opening defined by deformation of said sidewall along a first axis and a second axis; said first and second axes both being in a transverse direction from said flow path, wherein said deformable sidewall at said first axis is pressed toward said valve member and said deformable sidewall at second axis is pushed outward from said valve member, said first axis and said second axis reside about any radial position about said sidewall of said housing.

6. The drink valve according to claim 5, wherein said first and said second axis are perpendicular to each other.

* * * * *